J. F. CARTER & C. E. PERKINS.
UNIVERSAL JOINT.
APPLICATION FILED JUNE 7, 1912.
1,101,996.
Patented June 30, 1914.
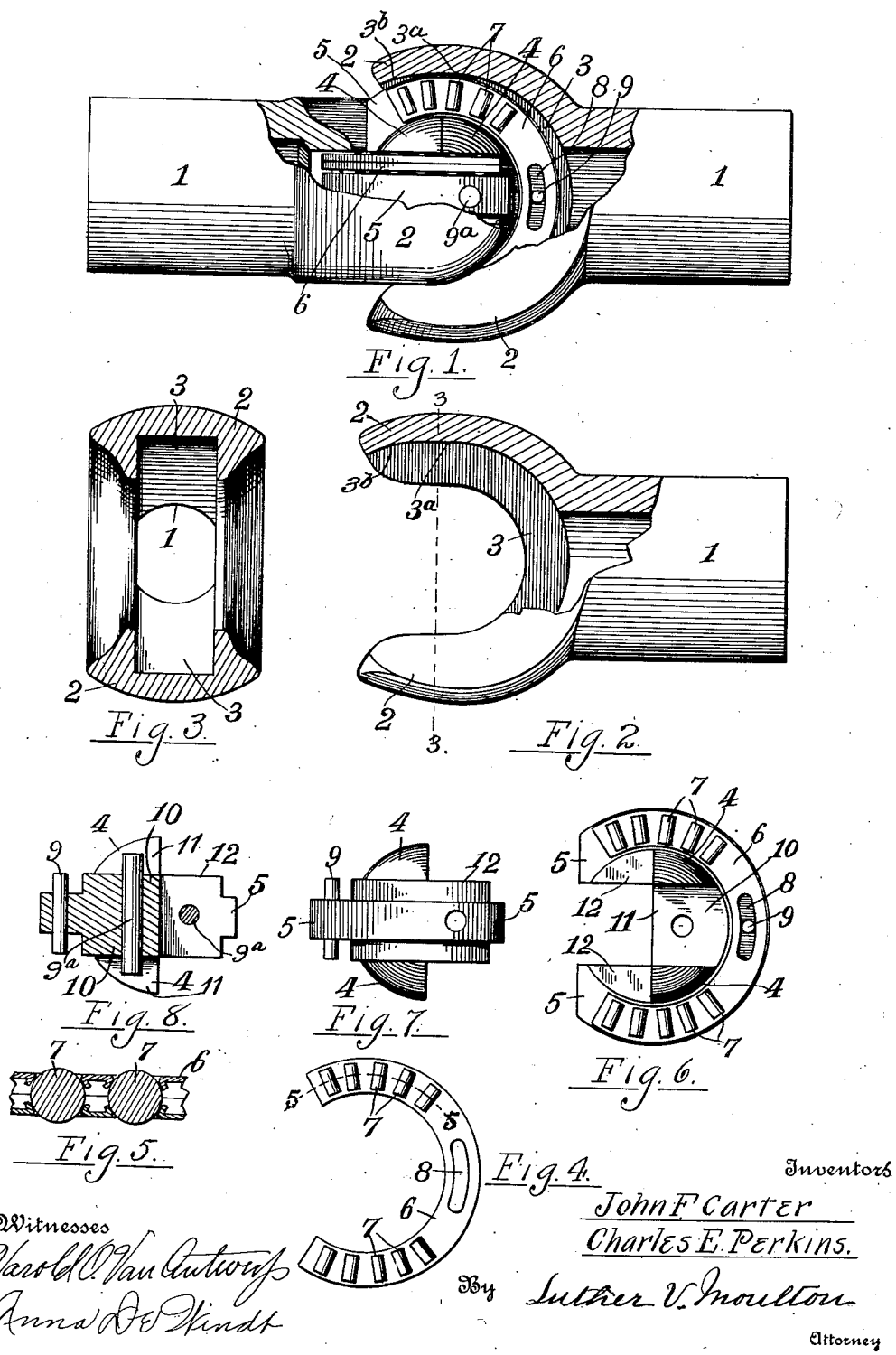
Witnesses
Harold O. Van Antwerp
Anna D. Kindt
Inventors
John F Carter
Charles E. Perkins.
By Luther V. Moulton
Attorney

UNITED STATES PATENT OFFICE.

JOHN F. CARTER AND CHARLES E. PERKINS, OF GRAND RAPIDS, MICHIGAN, ASSIGNORS TO MICHIGAN AUTO JOINT COMPANY, OF GRAND RAPIDS, MICHIGAN, A CORPORATION OF MICHIGAN.

UNIVERSAL JOINT.

1,101,996.

Specification of Letters Patent. Patented June 30, 1914.

Application filed June 7, 1912. Serial No. 702,166.

*To all whom it may concern:*

Be it known that we, JOHN F. CARTER and CHARLES E. PERKINS, citizens of the United States of America, residing at Grand Rapids, in the county of Kent and State of Michigan, have invented certain new and useful Improvements in Universal Joints; and we do hereby declare the following to be a full, clear, and exact description of the invention, such as will enable others skilled in the art to which it appertains to make and use the same.

Our invention relates to improvements in universal joints, and its object is to provide a device adapted to expand and contract longitudinally and to transmit power between shafts that are out of alinement, and to provide the same with various new and useful features whereby the same will be more effective and satisfactory in operation than devices heretofore used for the purpose. These universal joints are usually of such moderate dimensions that the frictional stress is very great and the sliding movement therein subjected to such frictional resistance that there is great wear and strain upon the device and particularly in respect to the longitudinal expansion and contraction. The longitudinal stress on the respective shafts due to this friction is often so great as to result in injury of the mechanism, as for instance, in automobiles the distance between the engine and the axle driven thereby is variable according to the movement of the springs resulting in a considerable lateral stress upon the axle due to the friction in the universal joint, and resistance to its longitudinal expansion and contraction.

One of the objects of our invention is to avoid this stress and other frictional resistance in the joint whereby the same will operate with less waste of power and to that end our invention consists in providing the device with anti-friction members inserted between the driving and driven surfaces of the device and to locate the same as far from the axis of rotation as convenient, whereby the stress in delivering a given amount of power is reduced to a minimum.

Our device consists essentially of two sockets or collars adapted to receive the respective ends of the shafts to be connected, each being provided with a pair of jaws internally grooved to embrace a middle member having ribs engaging the said grooves and arranged substantially at right angles to each other on the middle member, and antifriction rollers between the flanges and the walls of the groove, said rollers being arranged in opposing groups whereby the frictional stress due to driving or rotating the shafts is reduced, the rollers also reducing the friction due to sliding of the flange in the groove in the direction of the axis of the shafts. These groups of rollers are preferably mounted in retainers whereby they are held in proper position, and the retainers limited in their movement about the axis of the middle member, as will more fully appear by reference to the accompanying drawings, in which:

Figure 1 is a side elevation of a device embodying our invention with portions broken away to show the construction; Fig. 2 is a detail of one of the jaws partially broken away and shown in side elevation; Fig. 3 a transverse section of the same on the line 3—3 of Fig. 2; Fig. 4 a detail in elevation of the roller bearings; Fig. 5 an enlarged detail in section on the line 5—5 of Fig. 4; Fig. 6 a detail in elevation showing the arrangement of the roller bearings; Fig. 7 an elevation of one half of the middle member detached; and Fig. 8 the same with one half broken away to show a vertical section.

Like numbers refer to like parts in all the figures.

The entire device consists of duplicate parts and when assembled they are preferably connected by pins 9$^a$ inserted in the middle member 10, and jaws 12 to hold the parts thereof connected to each other.

1 is a socket to receive the shaft at one end and provided at the other end with a pair of jaws 2 having an internal groove 3. These jaws 2 are substantially semi-circular and with the axis of the groove 3 at right angles to the axis of the socket. The jaws are also prolonged longitudinally and the grooves are parallel a sufficient distance as at 3$^a$ to permit a sliding movement of the middle member 4 in the direction of the axis of the socket. The outer ends of the grooves 3 are slightly contracted as at 3$^b$, to retain the middle member 4 therebetween. The two parts of the middle member 4 are duplicates, and when assembled form a globular body, separable in a plane through its center, each part having opposing parallel jaws 12, and opposite recesses 11 to receive the jaws 12 of the other part. The two parts when assembled may be secured together by pins 9ª. Each part is also provided with a circular rib 5, the sides of which are parallel with each other. This rib extends from the point of one jaw equatorially around the body to the point of the other jaw, and is concentric with the center of the member 4.

The ribs 5 and the retainers 6 are less than a complete circle producing a reduced diameter in one dimension, and by turning them to bring the reduced portion opposite the contracted ends 3ᵇ of the grooves, they will pass this contracted portion. Each half of the middle member and its accompanying rollers and retainers being thus entered into the respective grooves 3 of the jaws 2 and turned to operative position, the middle member 4 can then be assembled and by turning the joint out of alinement to the limit, the pins 9ª can be inserted and when the members 1 are again brought into operative alinement, the jaws 2 will cover the pins 9ª and retain them in place.

The groove 3 is considerably wider than the thickness of the rib 5 leaving a space at each side between the rib and the walls of the groove. In this space is inserted at opposite sides of the rib anti-friction rollers 7 oppositely engaging the rib and the wall of the groove, and these rollers are spaced apart and held in proper place by retainers 6 which are preferably of sheet metal and each provided with a segmental slot 8 midway between the groups of rollers to receive a pin 9 inserted in the rib 5 and projecting therefrom within the slots 8. This pin prevents the retainers from becoming displaced and the slots permit sufficient movement of the retainers about the axis of the middle member to properly permit the rollers to operate.

In operation as the sockets 1 swing out of alinement the frictional resistance to the rotation of the ribs 5 in the groove is prevented by the rollers which will roll between the rib and the wall of the groove about the axis of the middle member. If for any reason the distance changes between the driving and driven mechanism so that the shafts require to be elongated or shortened this joint will elongate or contract by longitudinal movement of the jaws toward or away from each other and the rollers being substantially transverse to this movement will reduce the frictional resistance sufficient so that there is but little resistance and consequent longitudinal stress on the shafts. These rollers being in grooves in the jaws are located at a maximum distance from the axis of rotation and are thus subjected to less stress than would be the case if the sliding movement was nearer the axis, as for instance in the middle member.

We are aware that anti-friction rollers or balls are frequently used in various relations to reduce friction. While we have shown rollers in the drawings, obviously balls would be equivalent, therefor, the advantage of the rollers being in that they present greater contact surface and will stand up under heavier service while balls would roll more freely in all directions and in this respect be somewhat superior. We do not, however, consider ourselves limited in this respect, and desire to be understood as covering either the use of rollers or balls as preferred.

We claim:

1. In a universal joint, two pairs of jaws, said jaws being internally grooved, semi-circular at the bottom and prolonged in parallel lines, and a globular middle member embraced by each pair of jaws and having equatorial ribs on said member arranged in planes at right angles to each other, said ribs being concentric with the center of said member and inserted in the grooves of the respective pairs of jaws, said ribs being rotative in the grooves about the center of said middle member and also slidable in the grooves in the direction of the axis of rotation.

2. In a universal joint, internally grooved jaws, said jaws being prolonged in parallel lines, and contracted at their outer ends, a middle member separable into parts in a plane through its center, each part having a reduced portion whereby in one position it will pass the contracted portion of the said jaws, but when in operative position it is retained within the said jaws by the contracted ends thereof, said middle member being embraced by the jaws, and having ribs slidable in the grooves of the jaws in the direction of the axis of rotation, and means for securing the parts of the middle member together.

3. In a universal joint, a pair of jaws internally grooved and prolonged in parallel lines and contracted at their outer ends, a middle member separable into parts in a plane through its center, each part having a reduced portion whereby in one position it will pass through the contracted portion of the said jaws, but when in operative position it is retained within the said jaws by the contracted ends thereof, said middle member being embraced by the jaws and each part having an equatorial rib inserted in the said groove and rotative therein about the axis of the middle member, said rib being also slidable in said groove in the direction of the axis of rotation, and means for securing the two parts of the middle member together.

4. In a universal joint, a pair of internally grooved jaws, a globular middle member therebetween having an equatorial rib inserted in said groove and spaced apart from the opposite walls thereof, anti-friction rollers arranged in groups at opposite sides of the axis of the middle member, and a retainer to control the rollers and having a limited rotary movement about the axis of the middle member.

5. In a universal joint, a pair of internally grooved semi-circular jaws, the same being prolonged at opposite sides in parallel lines, a globular middle member embraced by the jaws and having an equatorial rib inserted in the groove of the jaws and spaced apart from the opposing walls thereof, anti-friction rollers between the walls of the groove and the rib and arranged in groups at opposite sides of the axis of rotation, retainers provided with segmental slots to engage the rollers and retain the same in place, and a pin in the rib and oppositely extending therefrom within the slots.

6. In a universal joint, a socket to receive a shaft at one end and having semi-circular jaws at the other end, said jaws being prolonged in parallel lines and internally grooved, a globular middle member having an equatorial rib inserted in the groove and rotative in the groove about the axis of the middle member and spaced apart from the opposite walls of the groove, anti-friction rollers arranged in groups at opposite sides of the rib and at opposite sides of the axis of rotation, retainers for said rollers each having a segmental slot midway between the respective groups of rollers therein, and a pin inserted in the rib and oppositely extending within said slots.

7. In a universal joint, a socket adapted at one end to receive a shaft and having jaws at the other end semi-circular at the bottom and prolonged at opposite sides in parallel lines and contracted at their outer ends and also provided with an internal groove, a globular middle member having an equatorial rib and cylindrical portions at each side thereof, said rib being inserted in said groove and spaced apart from the opposite walls of the same, and rotative in the groove concentric with the center of the middle member and also movable in the groove in a line with the axis of rotation of the jaws, anti-friction rollers at opposite sides of the rib and engaging the walls of the groove, retainers rotative about the cylindrical portions on the middle member, and means for limiting said rotation.

8. In a universal joint, a globular middle member made in two parts, each part having an equatorial rib and a cylindrical portion oppositely projecting therefrom, said rib and portion being recessed to receive the other part, pins in said member to connect the two parts to each other, retainers at each side of the equatorial rib and rotative about the cylindrical portion, anti-friction members in said retainers and two sockets to respectively receive shafts at their outer ends and having their inner ends provided with jaws to embrace the middle member in planes at right angles to each other, said jaws being internally grooved to receive the ribs, retainers and anti-friction members, and also prolonged at opposite sides in parallel lines to permit the middle member to move longitudinally therein, and contracted at the open end to retain the same between the jaws.

9. In a universal joint, a coupling member separable in a plane extending through its center and having interlocking members whereby the parts are maintained in operative relation, and also having an oppositely projecting equatorial rib on each part.

10. In a universal joint, a globular coupling member separable in a plane extending through its center, each part having opposing parallel jaws and opposite recesses, the recesses of each part adapted to receive the jaws of the other part and also having an oppositely projecting equatorial rib on each part.

11. In a universal joint, a globular coupling member separable in a plane extending through its center, each part having opposing parallel jaws and opposite recesses, the recesses of each part adapted to receive the jaws of the other part, each part also having an equatorial rib extending from the point of one jaw around to the point of the opposite jaw.

12. In a universal joint, a globular coupling member separable in a plane extending through its center, each part having opposing parallel jaws and opposite recesses, the recesses of each part adapted to receive the jaws of the other part, each part also having an equatorial rib on the jaws, and means for securing the parts in fixed relation.

In testimony whereof we affix our signatures in presence of two witnesses.

JOHN F. CARTER.
CHARLES E. PERKINS.

Witnesses:
HAROLD O. VAN ANTWERP,
ANNA DE WINDT.